United States Patent Office 3,228,762
Patented Jan. 11, 1966

3,228,762
METHOD OF KILLING WEEDS
Raymond W. Luckenbaugh, Wilmington, Del., assignor to E. I. du Pont de Nemours and Company, Wilmington, Del., a corporation of Delaware
No Drawing. Original application Oct. 3, 1960, Ser. No. 59,849, now Patent No. 3,112,342, dated Nov. 26, 1963. Divided and this application Mar. 8, 1963, Ser. No. 271,264
5 Claims. (Cl. 71—2.6)

This is a division of application Serial No. 59,849, filed October 3, 1960, now U.S. Patent No. 3,112,342.

This invention relates to a class of aryl methoxy ureas, and to herbicidal compositions and methods.

Nutsedge is a specie of vegetation that has proven to be one of the most difficult to destroy by the use of chemicals. It has resisted attack from most known commercially available herbicides at economic rates of application. The compounds of the present invention provide a practical herbicide useful in preventing the growth of this noxious weed.

The compounds of this invention are represented by the formula:

(1)

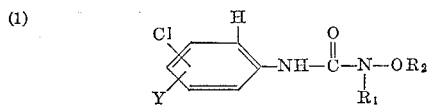

where:
Y is alkyl of 2 through 4 both inclusive carbon atoms, nitro, or alkoxy of less than 5 carbon atoms;
$R_1$ is alkyl of less than 5 carbons, preferably methyl; and
$R_2$ is alkyl of less than 5 carbons.

Compounds of this invention can be prepared by the reaction of the appropriate substituted phenylisocyanate with the appropriate N,O-dialkylhydroxylamine. This is conveniently carried out by gradual addition of the isocyanate in an inert liquid to a solution of the amine in the same liquid. Solvents such as xylene, toluene, dioxane, hexane, ether, acetone, water and the like, can be used. Ordinarily, temperatures in the range of 0 to 130° C. are satisfactory. The amine can alternatively be added to the isocyanate.

By the above-described route compounds such as the following can be prepared:

3-(3-nitro-4-chlorophenyl)-1-methyl-1-methoxyurea
3-(3-chloro-4-methoxyphenyl)-1-methyl-1-methoxyurea
3-(3-chloro-4-ethylphenyl)-1-methyl-1-methoxyurea
3-(3-chloro-4-butoxyphenyl)-1-methyl-1-methoxyurea
3-(3-chloro-4-butylphenyl)-1-methyl-1-methoxyurea
3-(2-chloro-4-nitrophenyl)-1-methyl-1-methoxyurea
3-(3-nitro-4-chlorophenyl)-1-methyl-1-methoxyurea
3-(3-chloro-4-nitrophenyl)-1-isopropyl-1-methoxyurea
3-(3-chloro-4-methoxyphenyl)-1-ethyl-1-methoxyurea
3-(3-chloro-4-isopropylphenyl)-1-methyl-1-ethoxyurea
3-(3-chloro-4-nitrophenyl)-1-methyl-1-butoxyurea
3-(3-nitro-4-chlorophenyl)-1-ethyl-1-isopropoxyurea
3-(2-chloro-4-nitrophenyl)-1-propyl-1-ethoxyurea
3-(3-chloro-4-methylphenyl)-1-butyl-1-ethoxyurea
3-(3-chloro-4-ethoxyphenyl)-1-ethyl-1-propoxyurea The compounds of this invention are particularly useful in the control of nutsedge as described above. They also provide excellent pre-emergence and post-emergence weed control in crops, such as corn, soybeans, sorghum, sugar cane, sansevieria, gladiola, and safflower. They have particular usefulness as a directed post-emergence spray on young annual weeds growing in fields of the above crops.

The compounds of this invention can be applied directly or formulated into compositions and applied to the area to be treated according to methods fully described in detail in Luckenbaugh United States Patent Number 2,935,393 issued May 3, 1960. The disclosure of that patent relating to compositions and methods of application is herewith incorporated by reference in its entirety.

Ordinarily, the herbicidal compounds of this invention will be applied to the area to be treated at a rate from 0.25 to 100 pounds per acre. Rates of about 1 to 3 pounds per acre give satisfactory weed control as indicated above in crop land.

When formulated with other materials, such materials can include fertilizer materials, other pest control agents such as insecticides and fungicides, and other herbicides. Highly effective herbicidal compositions can be prepared comprising at least one compound of this invention in admixture with another herbicidally active ingredient. In addition, the composition can contain one or more of the herbicidal composition adjuvants or conditioners fully described in the aforementioned Luckenbaugh patent, the pertinent disclosure of which is incorporated by reference herein.

Particularly useful compositions will contain, for each 10 parts by weight of a compound of the present invention, another herbicidally active ingredient listed as follows in the indicated amount expressed as parts by weight:

UREAS

| Parts | Herbicide |
|---|---|
| 2–30 | 3-(3,4-dichlorophenyl)-1,1-dimethylurea. |
| 2–30 | 3-(4-chlorophenyl)-1,1-dimethylurea. |
| 2–30 | 3-phenyl-1,1-dimethylurea. |
| 2–30 | 3-(3,4-dichlorophenyl)1-n-butyl-1-methylurea. |
| 2–30 | 3-(3,4-dichlorophenyl)-1,1,3-trimethylurea. |

PHENOLS

| | |
|---|---|
| 0.1–400 | Dinitro-sec. butylphenol and salts thereof. |
| 1.6–1,200 | Pentachlorophenol and salts thereof. |

CARBOXYLIC ACIDS AND DERIVATIVES

| | |
|---|---|
| 2–90 | 2-methoxy-3,5,6-trichlorobenzoic acid and salts thereof. |
| 1.5–70 | 2-methoxy-3,6-dichlorobenzoic acid and salts thereof. |
| .2–240 | 2,6-dichlorobenzonitrile. |
| 1.5–70 | 2,3,6-trichlorobenzoic acid and salts thereof. |
| 2–90 | 2,3,5,6-tetrachlorobenzoic acid and salts thereof. |
| .1–80 | 2,4-dichlorophenoxyacetic acid and salts and esters thereof. |
| .1–80 | 2,4,5-trichlorophenoxyacetic acid and salts and esters thereof. |
| .1–80 | (2-methyl-4-chlorophenoxy) acetic acid and salts and esters thereof. |
| .1–80 | 2-(2,4,5-trichlorophenoxy) propionic acid and salts and esters thereof. |
| .8–2,400 | 2,2-dichloropropionic acid and salts thereof. |
| 24–1,200 | 2-(2,4,5-trichlorophenoxy) ethyl-2,2-dichloropropionate. |
| .2–160 | 4(2,4-dichlorophenoxy) butyric acid and salts and esters thereof. |
| .2–160 | 4(2-methyl-4-chlorophenoxy) butyric acid and salts and esters thereof. |
| 2.4–4,800 | Trichloroacetic acid and salts thereof. |
| 3–400 | N-phenylcarbamic acid, isopropyl ester. |
| 3–400 | N-(m-chlorophenyl) carbamic acid, isopropyl ester. |
| 3–400 | N-(m-chlorophenyl) carbamic acid, 4-chloro-2-butynyl esters. |
| .8–160 | N,N-dipropylthiol carbamic acid, ethyl ester. |
| 1.5–70 | 2,3,6-trichlorophenylacetic acid and salts. |
| 3–240 | 2-chloro-N,N-diallylacetamide. |
| 3–320 | Maleic hydrazide. |

TRIAZINES

| | |
|---|---|
| 2–30 | 2-chloro-4,6-bis(ethylamino)-s-triazine. |
| 2–30 | 2-chloro-4-ethylamino-6-isopropylamino-s-triazine. |
| 2–30 | 2-chloro-4,6-bis(methoxypropylamino)-s-triazine. |
| 2–30 | 2-methoxy-4,6-bis(isopropylamino)-s-triazine. |

INORGANIC AND MIXED INORGANIC-ORGANIC SALTS

| | |
|---|---|
| 7.5–400 | Disodium monomethylarsonate. |
| 7.5–400 | Octyl-dodecylammonium methylarsonate. |
| 4–300 | Sodium arsenite. |
| 3,200–130,000 | Lead arsenate. |
| 1,600–65,000 | Calcium arsenate. |
| 900–32,000 | Sodium tetraborate hydrated, granulated. |
| 900–32,000 | Sodium metaborate. |
| 900–32,000 | Sodium pentaborate. |
| 900–32,000 | Unrefined borate ore such as borascu. |
| 2.5–2,000 | Sodium chlorate. |
| 4–800 | Ammonium sulfamate. |
| .1–240 | 5,6-dihydro-(4A,6A)-dipyrido-(1,2-A,2′,1′-C)-pyrazinium dibromide. |

The following examples, in which the parts are by weight, further illustrate the preparation, compositions and utility of the novel compounds and compositions according to this invention:

Example 1

To a solution of 6.1 parts of N,O-dimethylhydroxylamine in 150 parts of toluene there is added slowly 19.6 parts of 3-chloro-4-isopropylphenylisocyanate dissolved in 50 parts of toluene over a 15 minute period. The temperature is maintained below 35° C. by slight cooling with an ice bath. The solution is stirred 3 hours at room temperature and then the solvent is evaporated in vacuum with a water pump on a steam bath. The solid residue is triturated thoroughly with n-pentane, filtered, and air dried. There is obtained 19.5 parts of essentially pure 3-(3-chloro-4-isopropylphenyl)-1-methyl-1-methoxyurea. It is a white solid having a melting point of 192.5.

Additional compounds are prepared in accordance with the procedure of Example 1 by substituting the following indicated parts of isocyanate reactant for the isocyanate reactant of that example, to obtain the indicated products:

| Ex. | Parts | Isocyanate | Product |
|---|---|---|---|
| 2 | 19.6 | 3-nitro-4-clorophenyl isocyanate. | 3-(3-nitro-4-chlorophenyl)-1-methyl-1-methoxyurea. |
| 3 | 18.4 | 3-chloro-4-methoxyphenyl isocyanate. | 3-(3-chloro-4-methoxyphenyl)-1-methyl-1-methoxyurea. |
| 4 | 21.0 | 3-chloro-4-ethylphenyl isocyanate. | 3-(3-chloro-4-ethylphenyl)-1-methyl-1-methoxyurea. |
| 5 | 22.6 | 4-chloro-4-butoxyphenyl isocyanate. | 3-(3-chloro-4-butoxyphenyl)-1-methyl-1-methoxyurea. |
| 6 | 23.8 | 3-chloro-4-butylphenyl isocyanate. | 3-(3-chloro-4-butylphenyl)-1-methyl-1-methoxyurea. |
| 7 | 19.6 | 2-chloro-4-nitrophenyl isocyanate. | 3-(2-chloro-4-nitrophenyl)-1-methyl-1-methoxyurea. |

Additional compounds within the scope of this invention, including compounds mentioned hereinbefore, can be prepared in accordance with the procedure of Example 1 by selection of appropriate reactants to obtain the desired products.

Example 8

The compounds of the preceding examples are formulated into water-dispersible powder herbicidal compositions in accordance with the present invention to provide compositions suitable for dispersion in water to give a herbicidal spray. The water-dispersible powder composition is made by intimately mixing the ingredients listed below using conventional mixing equipment and then grinding the mixture to give a powder having an average particle size less than about 50 microns.

(A)

| | Percent |
|---|---|
| Active ingredient | 75 |
| Fuller's earth | 23.75 |
| Sodium lauryl sulfate, 50% (wetting agent) | 1 |
| Methyl cellulose, 15 cps. (dispersing agent) | 0.25 |

(B)

| | |
|---|---|
| Active ingredient | 63 |
| Attapulgite | 35 |
| Alkylarylsodium sulfonate (Alkanol B) | 1.5 |
| Methylcellulose, 15 cps. | .5 |

These compositions are applied as a directed postemergence spray to seedling weeds in a corn field at a rate of one to two pounds per acre of active ingredient. Economic control of weeds such as crabgrass, nutsedge, yellow foxtail, annual ragweed, mustard, pigweed, morning glory, velvet leaf, and chickweed is obtained for an extended period without injury to the corn. In particular, this application is effective for control of nutsedge in the crop.

When applied as a pre-emergence spray, one to two pounds per acre of active ingredients gives good control of annual weeds in a field planted to soybeans.

Example 9

The compounds of Examples 1–7 are formulated into dust compositions in accordance with the present invention that are adapted for direct application as a dust. These dust compositions are made by blending or mixing the ingredients shown below and grinding the mix to give a composition having an average particle size less than about 50 microns.

| | Percent |
|---|---|
| Active ingredient | 20 |
| Talc | 80 |

The dust formulation is applied using conventional dusting apparatus at a dosage of 20 pounds per acre in a lumber yard to kill and prevent regrowth of an extended period of both broadleaf and grassy weeds including Johnson grass, crabgrass, pigweed, and mustard.

Example 10

The compound of Example 1 is formulated into a powdered herbicidal concentrate adapted for use in the preparation of a spray using either an oil, water, or a combination of oil and water as a liquid diluent. The powder concentrate is made by conventional mixing and grinding operations using the materials shown below in the rate proportions indicated.

| | Percent |
|---|---|
| Active ingredient | 70 |
| Alkylated aryl polyether alcohol (wetting and dispersing agent) | 4 |
| Fuller's earth | 26 |

This concentrate is dispersed in diesel oil or other herbicidal oil in proportions of 5 pounds of the concentrate for each 20 gallons of the oil. When applied at the rate of 25 lbs. of active ingredient per acre on ditch banks, excellent control of quackgrass, crabgrass, foxtail, nutsedge, ragweed, and Bermuda grass is obtained.

Example 11

The compound of Example 2 is formulated into the emulsifiable oil composition shown below by thoroughly mixing and dispersing the active ingredient and conditioning agents in the organic diluent.

| | Percent |
|---|---|
| Active ingredient | 25 |
| Long chain fatty alcohol sulfates (emulsifying agent) | 2 |
| Goulac (dispersing agent) | 3 |
| Kerosene | 70 |

This emulsifiable oil formulation is dispersed in water in the proportion of one quart of the composition for each 100 gallons of water. When applied at a rate of 30 pounds of active ingredients per acre to industrial sites and railroad sidings, weeds are substantially killed and the areas remain free of weeds for an extended period.

The invention claimed is:
1. The method of killing weeds comprising applying to the locus to be protected, in an amount sufficient to control the growth of undesired vegetation, a compound represented by the formula:

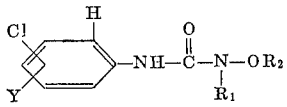

where:
Y is selected from the group consisting of alkyl of 2–4 carbons, nitro, and methoxy;
$R_1$ is methyl; and
$R_2$ is methyl.

2. The method of killing weeds comprising applying to the locus to be protected, in an amount sufficient to control the growth of undesired vegetation, 1-methoxy-1-methyl-3-(3-chloro-4-cumenyl)urea.

3. The method of killing weeds comprising applying to the locus to be protected, in an amount sufficient to control the growth of undesired vegetation, 1-methoxy-methyl-3-(3-nitro-4-chlorophenyl)urea.

4. The method of killing weeds comprising applying to the locus to be protected, in an amount sufficient to control the growth of undesired vegetation, 1-methoxy-1-methyl-3-(3-chloro-4-methoxyphenyl)urea.

5. The method of killing weeds comprising applying to the locus to be protected, in an amount sufficient to control the growth of undesired vegetation, 1-methoxy-1-methyl-3-(3-chloro-4-ethylphenyl)urea.

References Cited by the Examiner
UNITED STATES PATENTS

| | | | |
|---|---|---|---|
| 2,709,648 | 5/1955 | Ryker et al. | 71—2.6 |
| 2,960,534 | 11/1960 | Scherer et al. | 71—2.6 X |
| 3,079,244 | 2/1963 | Scherer et al. | 71—2.6 |
| 3,084,192 | 4/1963 | Smathers | 71—2.6 X |

LEWIS GOTTS, *Primary Examiner.*